United States Patent [19]

Muto et al.

[11] Patent Number: 6,137,587

[45] Date of Patent: *Oct. 24, 2000

[54] IMAGE OUTPUT APPARATUS, IMAGE OUTPUT SYSTEM AND INFORMATION PROCESSING APPARATUS

[75] Inventors: Shin Muto, Yokohama; Yukio Kanakubo, Kasukabe, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/597,675

[22] Filed: Feb. 6, 1996

[30] Foreign Application Priority Data

Feb. 8, 1995 [JP] Japan .................................. 7-020282

[51] Int. Cl.[7] .................................................. G06F 15/00
[52] U.S. Cl. ........................................ 358/1.15; 358/1.16
[58] Field of Search ..................................... 395/114, 113, 395/112, 115, 116, 101, 184.01; 358/404, 407, 437, 444, 468, 1.15, 1.14, 1.13, 1.16, 1.17, 1.1, 426, 261.4, 430; 702/186; 705/400; 709/247; 382/232

[56] References Cited

U.S. PATENT DOCUMENTS

| | | | |
|---|---|---|---|
| 5,047,955 | 9/1991 | Shope et al. | 395/116 |
| 5,047,957 | 9/1991 | Ikenoue | 395/114 |
| 5,337,258 | 8/1994 | Dennis | 395/184.01 |

FOREIGN PATENT DOCUMENTS

| | | | |
|---|---|---|---|
| 0631225 | 12/1994 | European Pat. Off. | G06F 3/12 |
| WO94/11805 | 5/1994 | WIPO | G06F 3/12 |

*Primary Examiner*—Dov Popovici
*Attorney, Agent, or Firm*—Fitzpatrick Cella Harper & Scinto

[57] ABSTRACT

It is an object of the present invention to shorten the time required to release an information processing apparatus such as a host computer from an output apparatus such as a printer when print information is transmitted from the information processing apparatus to the output apparatus. In step S501, print information is received. In step S502, it is checked whether information from another I/F is being processed. If YES in step S502, the print information is compressed and stored in a reception buffer. If NO in step S502, the flow directly advances to step S505 to store the print information in the reception buffer without compression.

19 Claims, 17 Drawing Sheets

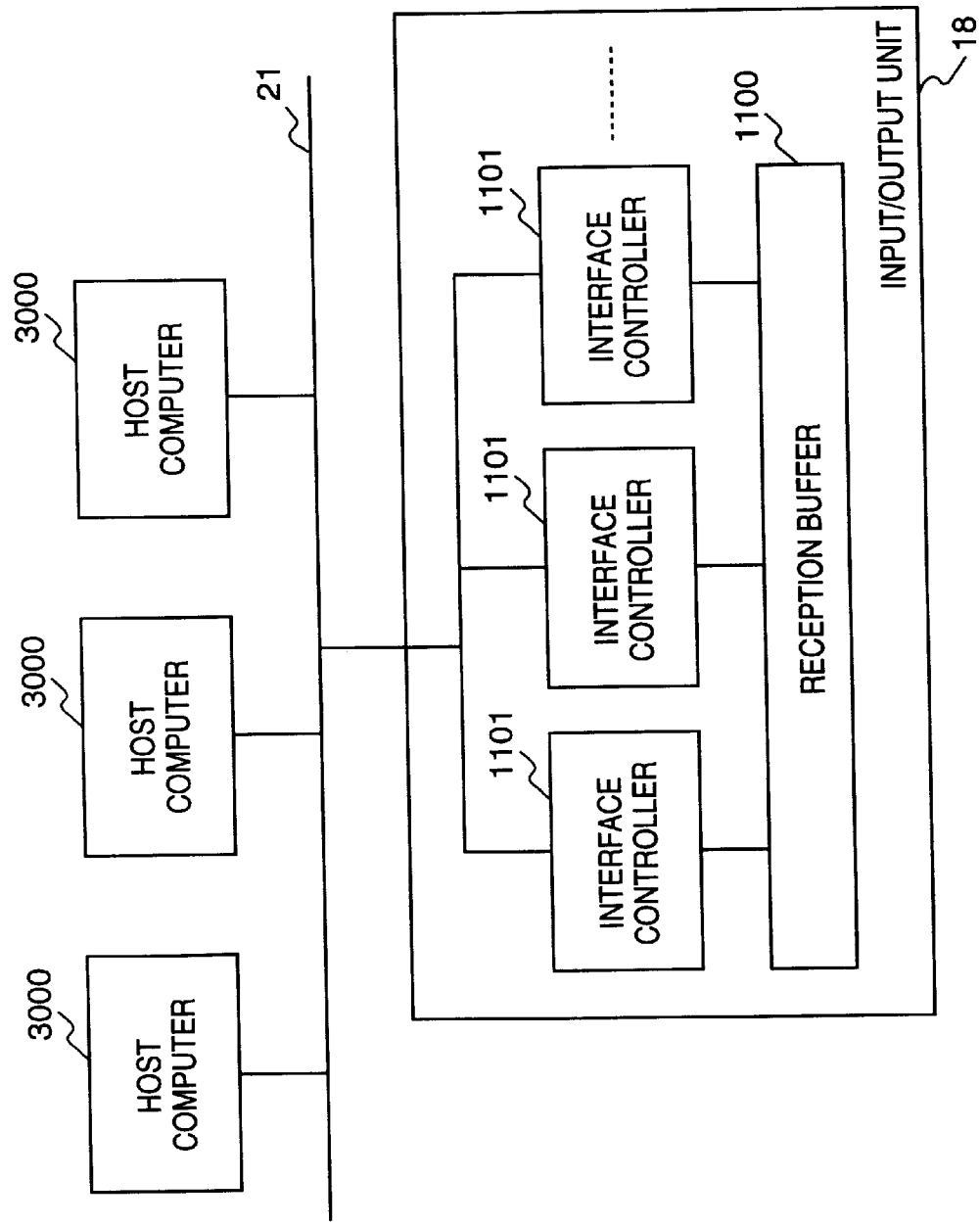

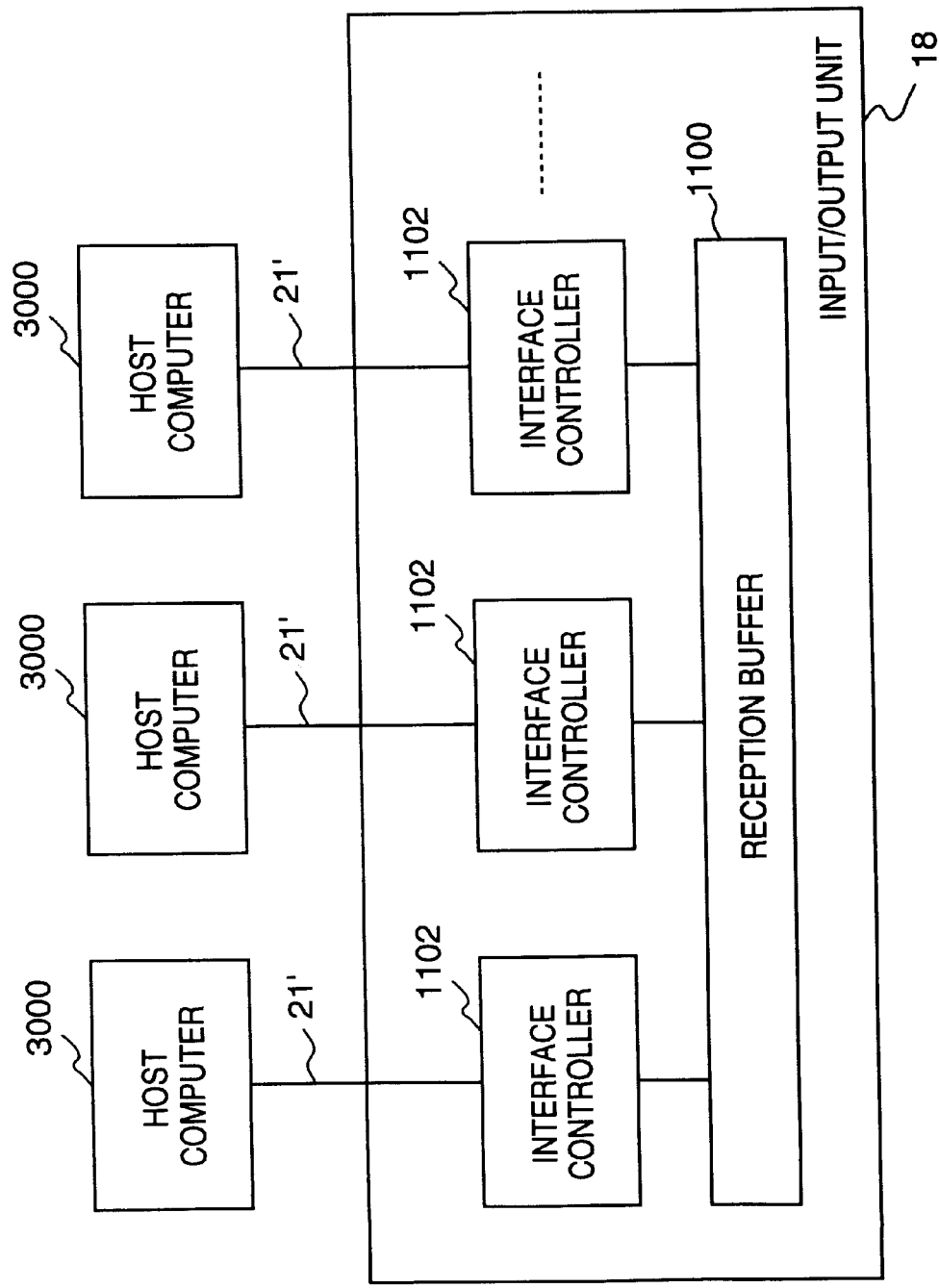

FIG. 17A

| | HOST COMPUTER A | HOST COMPUTER B | HOST COMPUTER C |
|---|---|---|---|
| FREQUENCY OF USE | 7 | 10 | 1 |
| PRIORITY | 2 | 1 | 3 |

| | HOST COMPUTER A | HOST COMPUTER B | HOST COMPUTER C |
|---|---|---|---|
| FREQUENCY OF USE | 7 | 10 | 1 |
| PRIORITY | 2 | 3 | 1 |

1700

IMAGE OUTPUT APPARATUS, IMAGE OUTPUT SYSTEM AND INFORMATION PROCESSING APPARATUS

BACKGROUND OF THE INVENTION

1. Field of the Invention

The present invention relates to an image output apparatus, an information processing apparatus, and an output system and, more particularly, to an output system for outputting images by supplying print information from a plurality of information processing apparatuses such as host computers to an output apparatus such as a printer, and an output apparatus and an information processing apparatus in the system.

2. Description of the Related Art

Assume that a conventional output apparatus such as a printer, which has a plurality of interfaces, simultaneously receives pieces of print information from a plurality of host computers. Even in this case, the apparatus can perform output processing for only one piece of print information at once. For this reason, pieces of print information transmitted from host computers other than the host computer which is transmitting the currently processed print information are stored in the reception buffer of the output apparatus and set in the wait state for the subsequent output processing. In addition, output processing for print information is performed in accordance with the order unique to the output apparatus.

In the above case, a host computer or the like in the wait state for output processing for print information may transmit a large amount of print information to the output apparatus. In this case, when the reception buffer of the output apparatus, in which the print information is stored, is filled with the information, the host computer or the like must stop the transmission processing. This is a main cause that prolongs the time required to release the host computer or the like from printing processing.

In addition, a user cannot arbitrarily set/change the priority of a specific printing process. For this reason, while a host computer or the like having an interface with a low transfer rate is receiving print information or performing output processing, even a host computer or the like having an interface with a high transfer rate must wait until the processing is completed.

SUMMARY OF THE INVENTION

The present invention has been made in consideration of the above related arts. It is an object of the present invention to provide an output apparatus which can shorten the time required to release an information processing apparatus such as a host computer from the output apparatus such as a printer when print information is transmitted from the information processing apparatus to the output apparatus. It is another object to allow selection of the order of a plurality of interfaces in performing output processing when pieces of print information are simultaneously transmitted to an output apparatus via the interfaces.

It is still another object of the present invention to provide an information processing apparatus which can shorten the time required to release the information processing apparatus such as a host computer from an output apparatus such as a printer when print information is transmitted from the information processing apparatus to the output apparatus.

It is still another object of the present invention to provide an output system which can shorten the time required to release an information processing apparatus such as a host computer from an output apparatus such as a printer when print information is transmitted from the information processing apparatus to the output apparatus.

According to the present invention, there is provided an output apparatus for outputting an image on the basis of print information sent from an information processing apparatus, comprising reception means for receiving the print information from the information processing apparatus, compression means for compressing the received print information, storage means for storing the compressed print information in a memory medium, expansion means for expanding the stored print information, and image output means for outputting the image on the basis of the print information.

Preferably, the output apparatus of the present invention further comprises determination means for determining whether the received print information is compressed by the compression means.

In the output apparatus of the present invention, when the reception means receives another piece of information while already received print information is being processed, the determination means preferably causes the compression means to compress this another piece of print information.

In the output apparatus of the present invention, the reception means preferably includes a plurality of interface means corresponding to a plurality of information processing apparatuses.

In the output apparatus of the present invention, when print information received by one of the interface means is being processed, and another interface means receives new print information, the determination means preferably causes the compression means to compress the new print information.

Preferably, the output apparatus of the present invention further comprises management means for managing the memory medium, the management means controlling the reception means to interrupt reception of succeeding print information when a free area shortage occurs in the memory medium.

In the output apparatus of the present invention, the management means preferably divides an area of the memory medium into a plurality of blocks, and manages the memory medium in units of divided blocks.

According to the present invention, there is provided another output apparatus for outputting an image on the basis of print information sent from an information processing apparatus, comprising detection means for detecting a transmission request for the print information from the information processing apparatus, request means for requesting the information processing apparatus as a transmission request source to compress and transmit the print information, reception means for receiving the print information received from the information processing apparatus as the transmission request source, storage means for storing the received print information in a memory medium, expansion means for expanding the stored print information, and image output means for outputting an image on the basis of the print information.

Preferably, this output apparatus of the present invention further comprises determination means for determining whether the information processing apparatus as the transmission request source is caused to compress and transmit the print information.

In this output apparatus of the present invention, when the reception means detects a transmission request for another piece of print information while already received print information is being processed, the determination means determines that the another piece of print information is compressed by an information processing apparatus as the transmission request source.

In this output apparatus of the present invention, the reception means includes a plurality of interface means corresponding to a plurality of information processing apparatuses, the detection means detecting a transmission request with respect to each of the plurality of interface means.

In this output apparatus of the present invention, when print information received by one of the interface means is being processed, and a transmission request for another piece of print information is generated by an information processing apparatus connected to another interface means, the determination means determines that the print information associated with the transmission request is compressed by the information processing apparatus.

Preferably, this output apparatus of the present invention further comprises management means for managing the memory medium, the management means controlling the reception means to interrupt reception of succeeding print information when a free area shortage occurs in the memory medium.

According to the present invention, there is provided an information processing apparatus for supplying print information to an output apparatus to output an image, comprising transmission request means for notifying the output apparatus of a transmission request for print information, reception means for receiving a compression request from the output apparatus, the compression request requesting to compress and transmit print information, compression means for compressing the print information in accordance with the received compression request, and transmission means for transmitting the print information to the output apparatus.

According to the present invention, there is provided still another output apparatus for outputting pieces of print information sent from a plurality of information processing apparatuses, comprising reception means for receiving the pieces of print information from the plurality of information processing apparatuses, priority order determination means for determining a priority order of each of the information processing apparatuses, and image output means for outputting an image associated with the corresponding print information on the basis of the determined priority order.

In this output apparatus of the present invention, the priority order determination means preferably determines the priority order on the basis of the number of times of reception of print information from each of the information processing apparatuses within a predetermined period of time.

In this output apparatus of the present invention, the priority order determination means preferably gives a higher priority to the information processing apparatus corresponding to a larger number of times of reception of print information.

In this output apparatus of the present invention, the priority order determination means preferably gives a higher priority to the information processing apparatus corresponding to a smaller number of times of reception of print information.

In this output apparatus of the present invention, the priority order determination means preferably gives a higher priority to the information processing apparatus associated with the previously processed print information.

In this output apparatus of the present invention, the priority order determination means preferably decreases a priority of the information processing apparatus associated with the previously processed print information.

Further objects, features and advantages of the present invention will become apparent from the following detailed description of the embodiments of the present invention with reference to the accompanying drawings.

BRIEF DESCRIPTION OF THE DRAWINGS

FIG. 15 is a block diagram showing an example of the logic arrangement of an input/output unit;

FIG. 16 is a block diagram showing an example of the physical arrangement of the input/output unit; and FIGS. 17A and 17B are views schematically showing priority tables.

DETAILED DESCRIPTION OF THE PREFERRED EMBODIMENTS

First Embodiment

The first embodiment of the present invention will be described with reference to the accompanying drawings.

Figure 1:
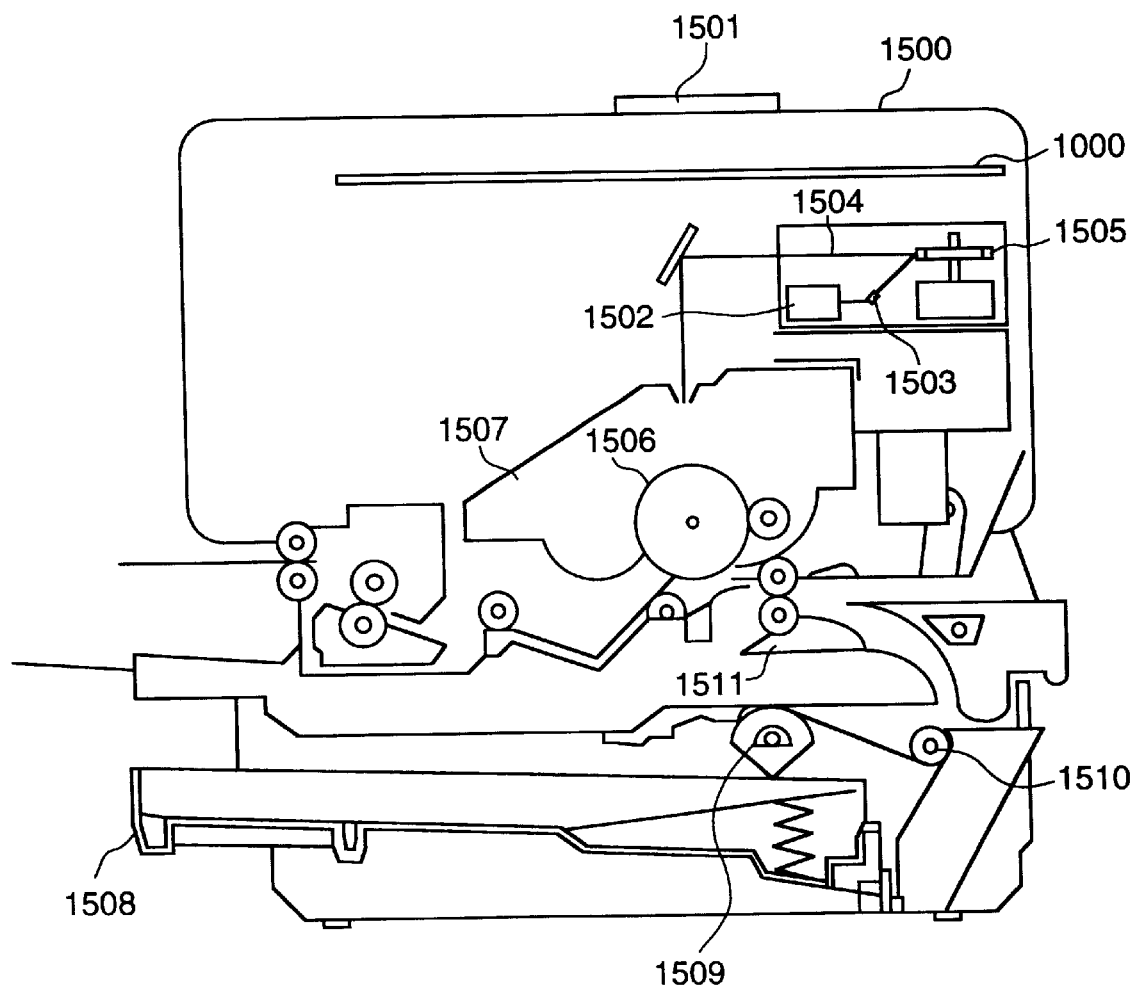
FIG. 1 is a sectional view showing the internal structure of a laser beam printer.

FIG. 1 is a sectional view showing the arrangement of a laser beam printer as the first output apparatus to which the present invention can be applied. The laser beam printer will also be referred to as an LBP hereinafter.

Referring to FIG. 1, reference numeral 1500 denotes an LBP body, which receives and stores print information (character codes and the like), form information, macro instructions, and the like supplied from an externally connected host computer, forms character and form patterns and the like corresponding to these pieces of information, and forms images on recording paper or the like as a recording medium.

Reference numeral 1501 denotes an operation panel on which switches for operations, LED displays, and the like are arranged; and 1000, a printer control unit for controlling the overall LBP body 1500 and analyzing character information and the like supplied from, e.g., a host computer. The printer control unit 1000 mainly converts character information into a video signal representing a corresponding character pattern, and outputs the signal to a laser driver 1502.

The laser driver 1502 is a circuit for driving a semiconductor laser 1503. The laser driver 1502 switches on/off a laser beam 1504 emitted from the semiconductor laser 1503 in accordance with the input video signal.

The laser beam 1504 is moved right and left by a rotary polygonal mirror 1505 to scan/expose an electrostatic drum 1506. With this operation, an electrostatic latent image of a character pattern is formed on the electrostatic drum 1506.

The latent image is developed first by a developing unit 1507 disposed around the electrostatic drum 1506 and is then transferred onto recording paper. As this recording paper, cut sheets are used. The cut sheets are stored in a paper cassette 1508 mounted in the LBP body 1500. A cut sheet is fed into the apparatus by a paper feed roller 1509, a convey roller 1510, and a convey roller 1511 to be supplied to the electrostatic drum 1506.

The LBP body 1500 has at least one card slot (not shown) to allow connection of an optional font card, and a control card (emulation card) for a language system different from the incorporated language system as well as the standard fonts.

Figure 2:
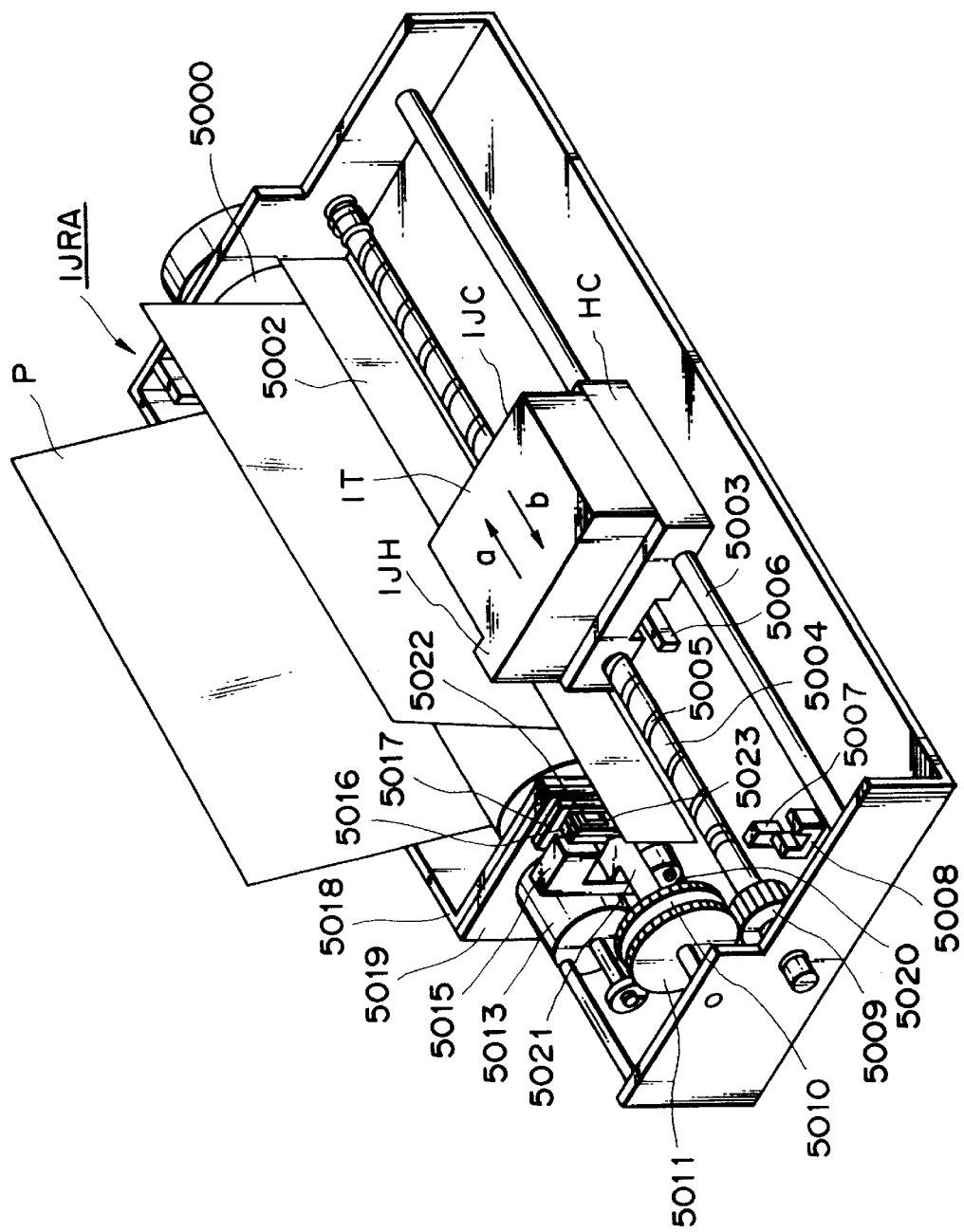
FIG. 2 is a perspective view showing the internal structure of an ink-jet printer.

FIG. 2 is a perspective view showing the arrangement of an ink-jet recording apparatus (IJRA) as the second output apparatus to which the present invention can be applied.

Referring to FIG. 2, a carriage HC is engaged with a helical groove 5004 of a reed screw 5005 which rotates upon clockwise/counterclockwise rotation of a driving motor 5013 via driving force transfer gears 5011 and 5009. The carriage HC has a pin (not shown) and is reciprocated in the directions indicated by arrows a and b. An ink-jet cartridge IJC is mounted on the carriage HC. Reference numeral 5002 denotes a paper press plate for pressing a sheet against a platen 5000 along the carriage moving direction.

Reference numerals 5007 and 5008 denote photocouplers serving as home position detection means for checking the presence of a carriage lever 5006 in a predetermined area to change the rotational direction of a driving motor 5013.

Reference numeral 5016 denotes a member for supporting a cap member 5022 for capping the entire surface of the recording head; and 5015, a suction means for applying suction into the cap. The suction means 5015 performs suction restoration of the recording head via an opening 5023.

Reference numeral 5017 denotes a cleaning blade which can be moved back and forth; 5018, a body support plate which supports the cleaning blade 5017 and the member 5019; and 5021, a lever for starting suction processing for suction restoration. The lever 5021 moves upon movement of a cam 5020 engaged with the carriage. A driving force from the driving motor is controlled by a known transfer means such as a clutch switching means.

As these capping, cleaning, and suction restoration operations, desired processes can be performed at corresponding positions owing to the function of the reed screw 5005 when the carriage reaches a home position area. However, these desired operations may be performed at known timings.

Figure 3:
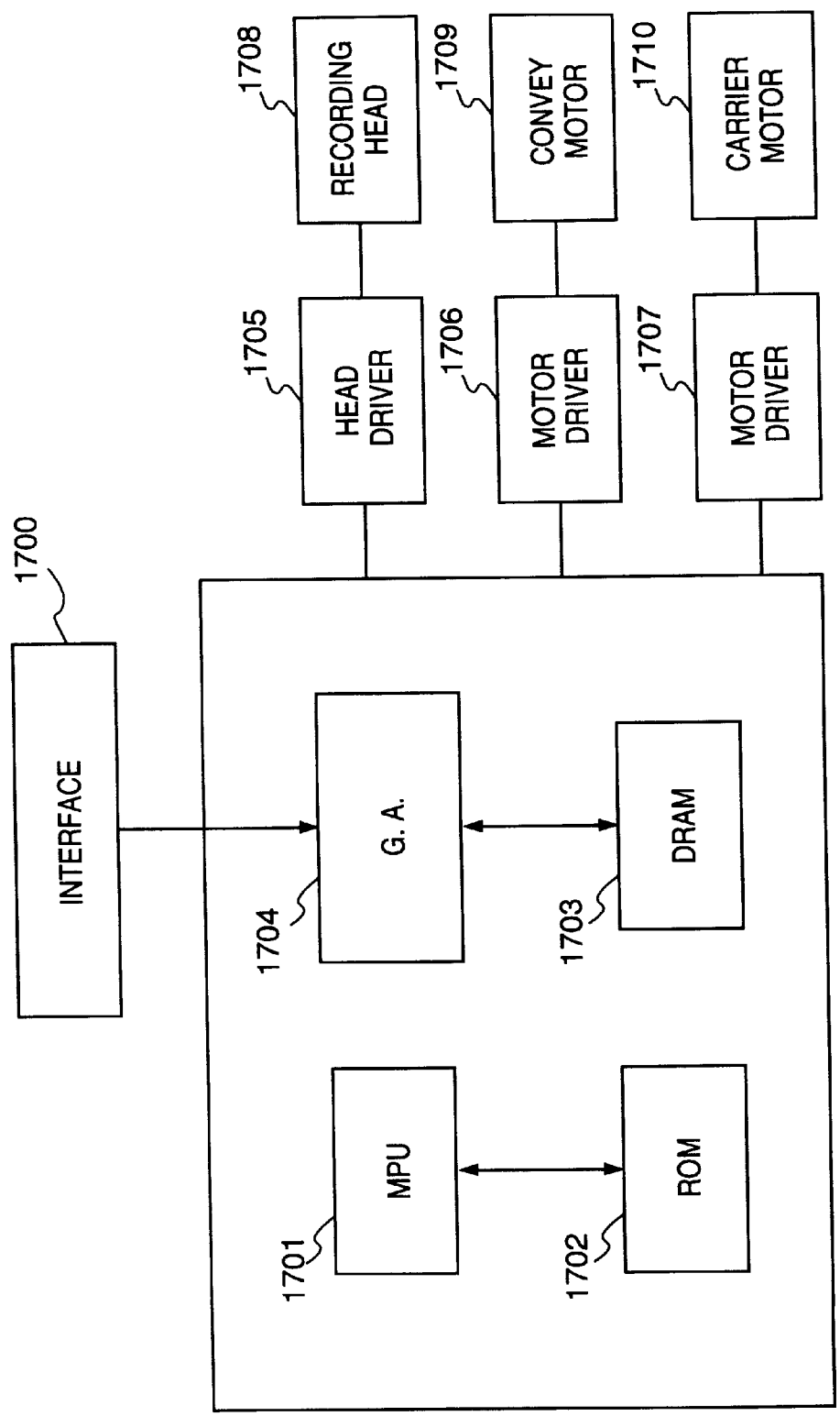
FIG. 3 is a block diagram for explaining the control arrangement of the ink-jet printer.

FIG. 3 is a block diagram for explaining the control arrangement of an ink-jet printer. Referring to FIG. 3, reference numeral 1700 denotes an interface for inputting a recording signal; 1701, an MPU; 1702, a ROM storing control programs executed by the MPU 1701 and host print information; and 1703, a DRAM for storing recording signals and various data such as recording data supplied to the head.

Reference numeral 1704 denotes a gate array for controlling the supply of output data to a recording head 1708, and controlling the transfer of data between the interface 1700, the MPU 1701, and the DRAM 1703.

The MPU 1701 can communicate with a host computer 3000 (to be described later) via the interface 1700. The MPU 1701 is also used for transmission of memory information, resource data, and the like associated with the DRAM 1703, host print information stored in the ROM 1702, and the like.

Reference numeral 1710 denotes a carrier motor for conveying the recording head 1708; 1709, a convey motor for conveying recording paper; 1705, a head driver for driving the recording head 1708; 1706, a motor driver for driving the convey motor 1709; and 1707, a motor driver for driving the carrier motor 1710.

In the above recording apparatus having this arrangement, when input information is received from the host computer 3000 via the interface 1700, the input information is converted into output information for a printing operation by the gate array 1704 and the MPU 1701. The information is then supplied to the head driver 1705. The head driver 1705 drives the recording head 1708 in accordance with the output information. In addition, the motor driver 1706 and the motor driver 1707 respectively drive the convey motor 1709 and the carrier motor 1710, thereby executing the printing operation.

As output apparatuses to which the present invention can be applied, a laser beam printer and an ink-jet printer have been described. However, it is apparent from the following embodiments to be described below, the present invention is not limited to the printers based on these printing methods, but can be applied to printers based on other printing methods.

Figure 4:
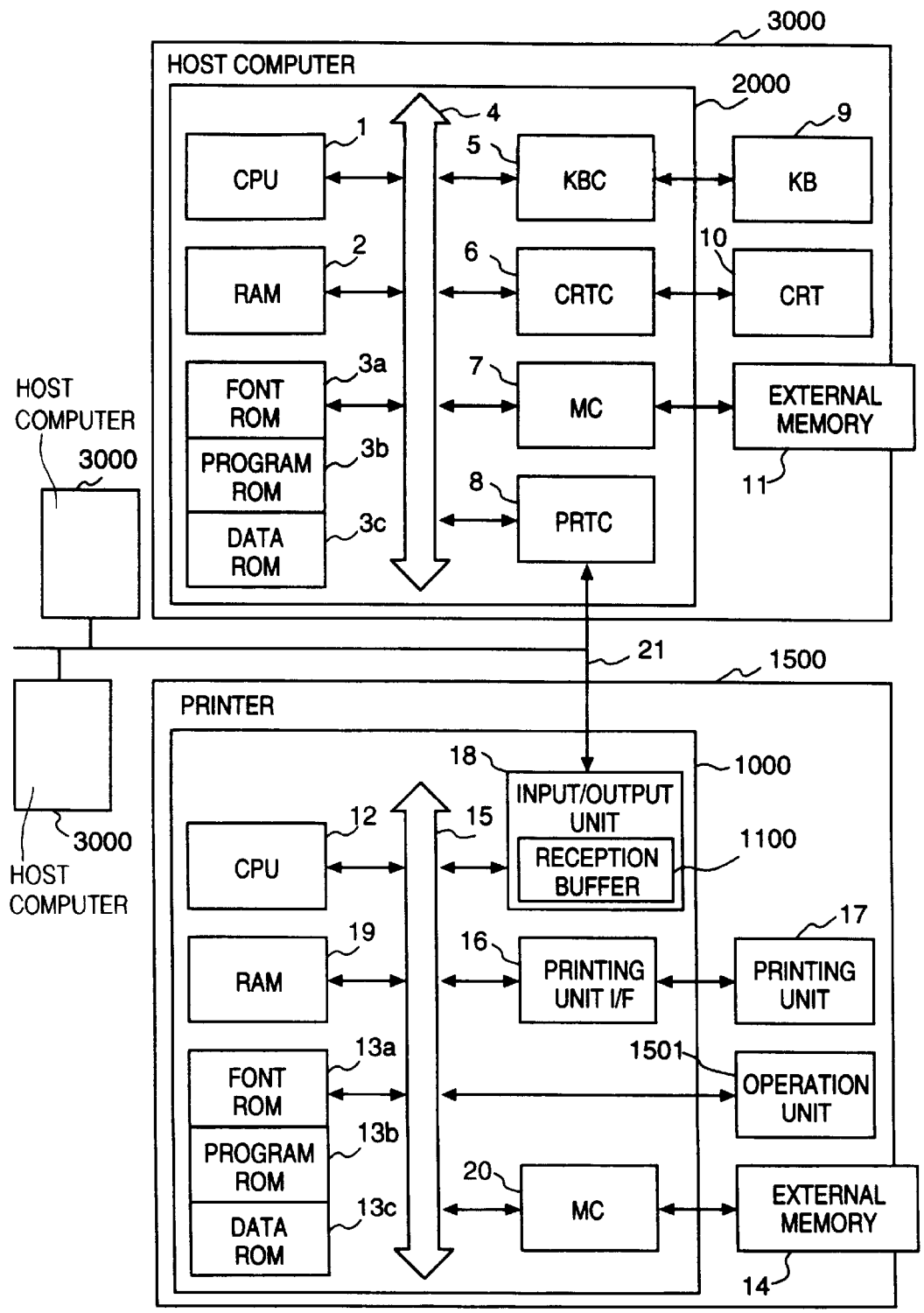
FIG. 4 is a block diagram showing the arrangement of a printer control system.

FIG. 4 is a block diagram for explaining the arrangement of a printer control system. The laser printer will be exemplified below.

Referring to FIG. 4, reference numeral 3000 denotes a host computer including a CPU 1 for executing processing for a document including graphic patterns, images, characters, tables (including spreadsheets), and the like on the basis of document processing programs and the like stored in a program ROM 3b. The CPU 1 systematically controls devices connected to a system bus 4.

The following devices are connected to the system bus 4: a font ROM 3a storing font data and the like to be used for document processing, the program ROM 3b, a data ROM 3c storing various data (e.g., print information initial values and error messages) used for document processing, and the main memory of the CPU 1 or a RAM 2 serving as a work area or the like. In addition, the following devices are connected to the system bus 4: a keyboard (KB) 9, a keyboard controller (KBC) 5 for controlling the key input operation of a pointing device (not shown), a CRT controller (CRTC) 6 for controlling a CRT display (CRT) 10, a memory controller (MC) 7 for controlling access to an external memory 11, and a printer controller (PRTC) 8.

The external memory 11 is constituted by a hard disk (HD) storing a boot program, various applications, font data, user data, files for editing, and the like, a floppy disk (FD), and the like.

The CPU 1 executes development (rasterlize) processing of outline fonts in a display information RAM set on, e.g., the RAM 2 to allow WYSIWYG on the CRT 10. In addition, the CPU 1 opens various windows registered on the basis of commands designated by a mouse cursor (not shown) and the like on the CRT 10, and executes various data processes.

The PRTC 8 is connected to the printer 1500 via a bidirectional interface cable (to be also referred to as an interface cable hereinafter) 21 to execute communication control processing for the printer 1500.

The printer 1500 includes a printer CPU 12 for systematically controlling access to various devices connected to a system bus 15 on the basis of control programs and the like stored in a program ROM 13b and control programs and the like stored in an external memory 14 so as to output an image signal as output information to a printing unit (printer engine) 17 via a printing unit interface 16.

The following devices are connected to the system us 15: a font ROM 13a, the program ROM 13b, a data ROM 13c, a RAM 19, an input/output unit 18 connected to the bidirectional interface cable 21, the printing unit interface 16 for controlling the printing unit 17, the operation panel 1501, and a memory controller (MC) 20 for controlling access to the external memory 14 such as the hard disk (HC) or an IC card.

The program ROM 3b stores control programs like those shown in the flow charts in FIGS. 5 to 10 and 14 (to be described later). The font ROM 13a stores font data and the like used to create output information. The data ROM 13c stores information and the like used on the host computer. Note that if the above information and the like are stored in the external memory 14, the data ROM 13c may be omitted.

The RAM 19 is a RAM serving as the main memory of the printer CPU 12, a work area, and the like, and is used as an output information development area, an environmental data storage area, an NVRAM, and the like. In addition, the memory capacity of the RAM area can be expanded by an option RAM connected to an expansion port.

Information or the like in the printer 1500 can be transmitted to the host computer 3000 via the input/output unit 18 in accordance with communication processing performed by the printer CPU 12. The input/output unit 18 has a function of connecting a plurality of host computers. In connecting a plurality of host computers, the host computers may be connected to the interface cable 21, or a plurality of interface controllers may be physically arranged in the input/output unit 18 to connect the host computers to the interface controllers. Other connection forms may be used.

FIG. 15 shows the first form of the input/output unit 18 connected to a plurality of host computers. Note that FIG. 15 shows the logic arrangement of the input/output unit 18. Each interface controller corresponds to a corresponding one of a plurality of host computers 3000, and has an address for specifying the corresponding host computer 3000.

FIG. 16 shows the second form of the input/output unit 18 for connecting a plurality of host computers. Note that FIG. 16 shows the physical arrangement of the input/output unit 18. Each interface controller 1102 is connected to a corresponding one of the host computers 3000 via a corresponding interface cable 21'.

The external memory 14 stores font data, emulation programs, form data, and the like. The external memory may include a plurality of memories. In addition to the standard fonts, an optional card and a plurality of external memories storing programs for interpreting printer control languages of different language systems. In addition, an NVRAM may be used to store printer mode set information from the operation panel 1501.

The processing operations of the printer control unit 1000 of the printer 1500 and the host computer 3000 will be described below.

Figure 11:
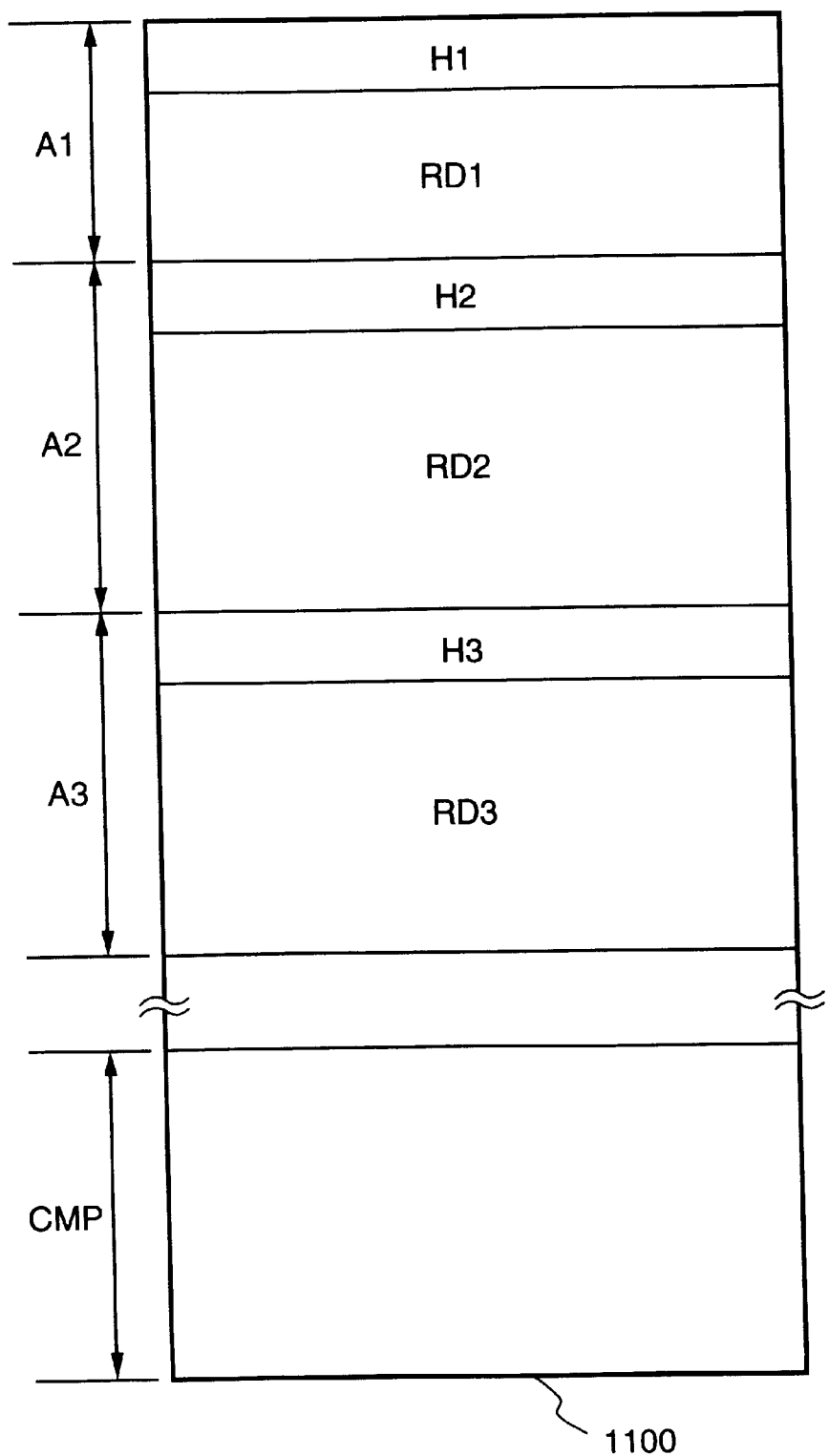
FIG. 11 is a view showing the internal structure of a reception buffer.

FIG. 11 shows a reception buffer 1100 arranged in the input/output unit 18 of the printer 1500. Print information received by the reception buffer via the bidirectional interface is properly compressed and stored to reduce the capacity of the reception buffer.

Referring to FIG. 11, reference symbols A1 to A3 denote storage areas for storing pieces of received print information and auxiliary information; and CMP, a compression processing area in which received print information is temporarily ensured when the information is compressed, and the print information is temporarily saved and compressed. Note that information indicating that compression processing has been performed is added to print information having undergone the compression processing.

The area A1 includes a print information area RD1 for storing print information. Reference symbol H1 denotes an auxiliary information area for storing a flag (to be referred to as a compression flag hereinafter) for indicating whether print information stored in the area RD1 is compressed, and auxiliary information including an address pointer for indicating the start address of print information. Similarly, the area A2 includes an auxiliary information area H2 for storing a compression flag associated with the print information area RD2, and an address pointer. The area A3 includes an auxiliary information area H3 for storing a compression flag associated with the print information area RD3, and an address pointer.

Figure 5:
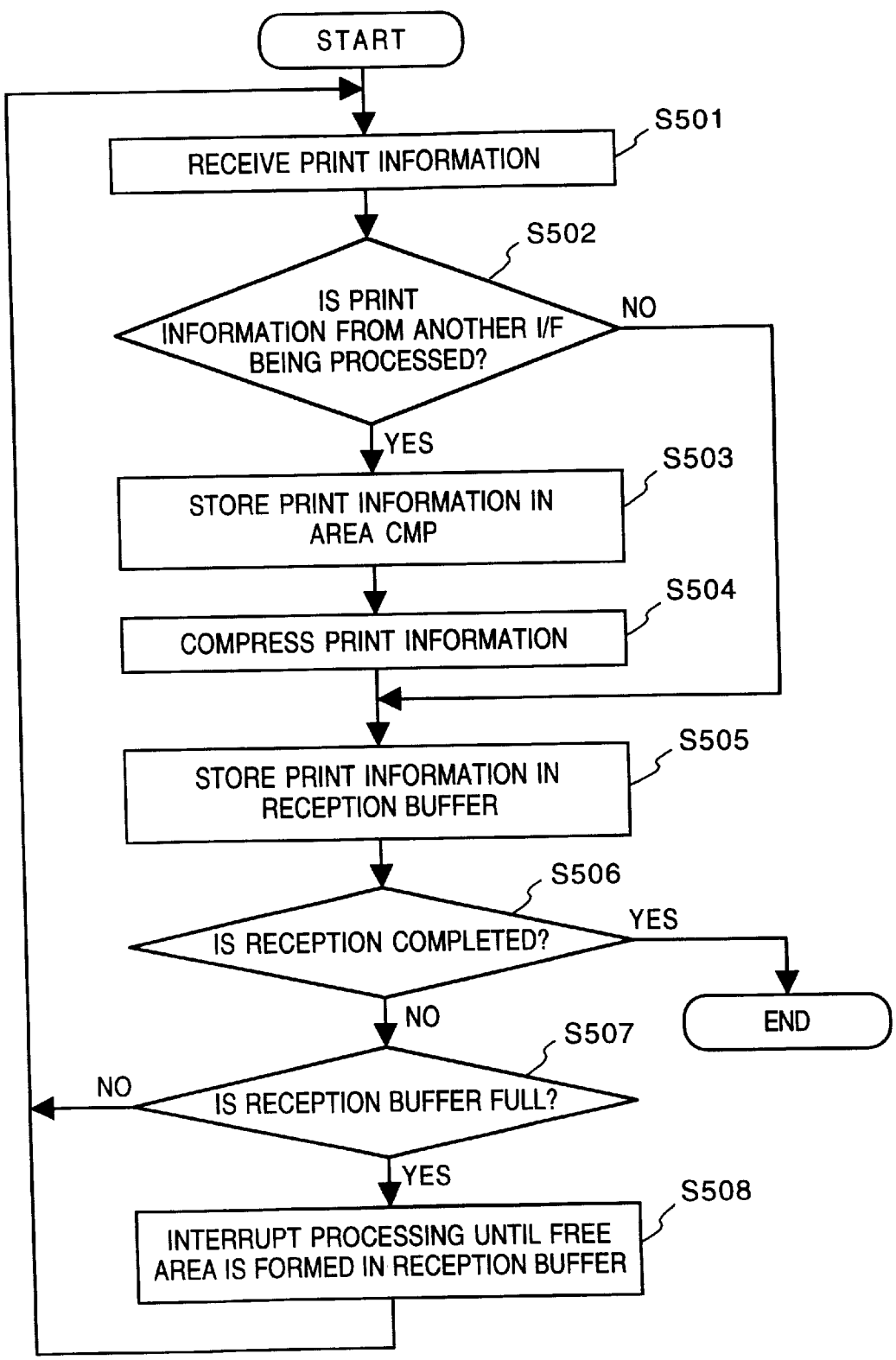
FIG. 5 is a flow chart showing the flow of reception processing for print information.

FIG. 5 is a flow chart showing the flow of processing in which print information, of print information transmitted from a plurality of host computers or the like, which is set in the wait state is compressed and stored in the reception buffer. Note that the program records associated with this flow chart are stored in the program ROM 13b or the external memory 14.

When print information is received from one of the host computers 3000 in step S501, the flow advances to step S502. In step S502, the processed state of another piece of print information received from another interface (host computer) is checked. If it is determined in step S502 that the information is being processed, the flow advances to step S503. In step S503, as described above, the reception buffer 1100 temporarily ensures the CMP area and stores the received print information. The flow then advances to step S504. In step S504, the print information stored in the CMP area is compressed, and auxiliary information is added to the compressed information. The flow advances to step S505 to store the compressed print information and the auxiliary information in a corresponding area (e.g., the area A3) of the reception buffer.

If it is determined in step S502 that another piece of print information is not being processed, the flow directly advances to step S505 to directly store the print information in the reception buffer 1100 without performing compression processing.

The received state is checked in step S506. If it is determined in step S506 that the reception processing is completed, the series of operations is terminated. If it is determined that the processing associated with another interface is not completed, the flow advances to step S507.

In step S507, a free area in the reception buffer 1100 is checked to determine whether further print information can be stored. If there is a free area in the reception buffer 1100, the flow advances to step S501 to repeat the series of operations. If the reception buffer 1100 is full, the flow advances to step S508.

In step S508, the reception processing is interrupted until printing processing of the print information stored in the reception buffer 1100 proceeds to form a free area in the reception buffer 1100. If a free area is formed, the flow returns to step S501 to repeat the series of operations.

Figure 7:
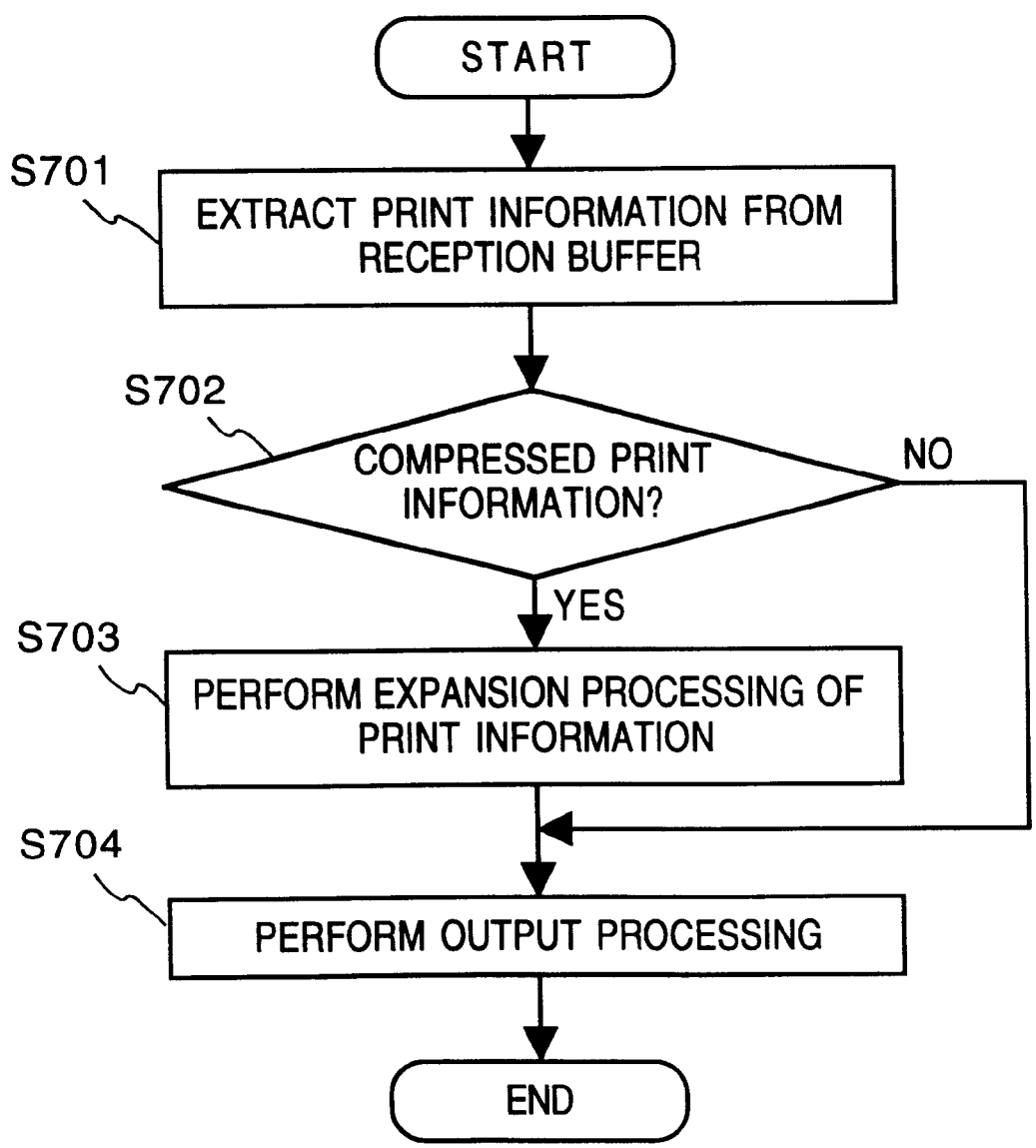
FIG. 7 is a flow chart showing the flow of output processing.

FIG. 7 is a flow chart showing the flow of output processing of print information stored in the reception buffer 1100. Note that the program codes associated with this flow chart are stored in the program ROM 13b or the external memory 14.

In step S701, print information is read out from the reception buffer 1100.

In step S702, it is checked on the basis of auxiliary information (from, e.g., the area H3) whether the print information has undergone compression processing. If YES in step S702, the flow advances to step S703 to perform expansion processing of the print information, and the flow advances to next step S704 to perform printing processing.

If it is determined in step S702 that the print information has not undergone compression processing, the flow directly advances to step S704 to perform printing processing.

Upon reception of print information from a host computer, the output apparatus checks the processed state of print information from another interface (host computer). If another piece of print information is being processed, the printer compresses the print information and stores it in the reception buffer, thus efficiently storing the print information. With this operation, even if a host computer transmits a large amount of print information, the information can be transferred without being waited by printing processing of information from another interface (host computer). As a result, the time in which a host computer is engaged in printing processing can be shortened.

Second Embodiment

In this embodiment, other processing operations of the control unit of the printer 1500 and the host computers 3000 in the first embodiment will be described.

Figure 6:
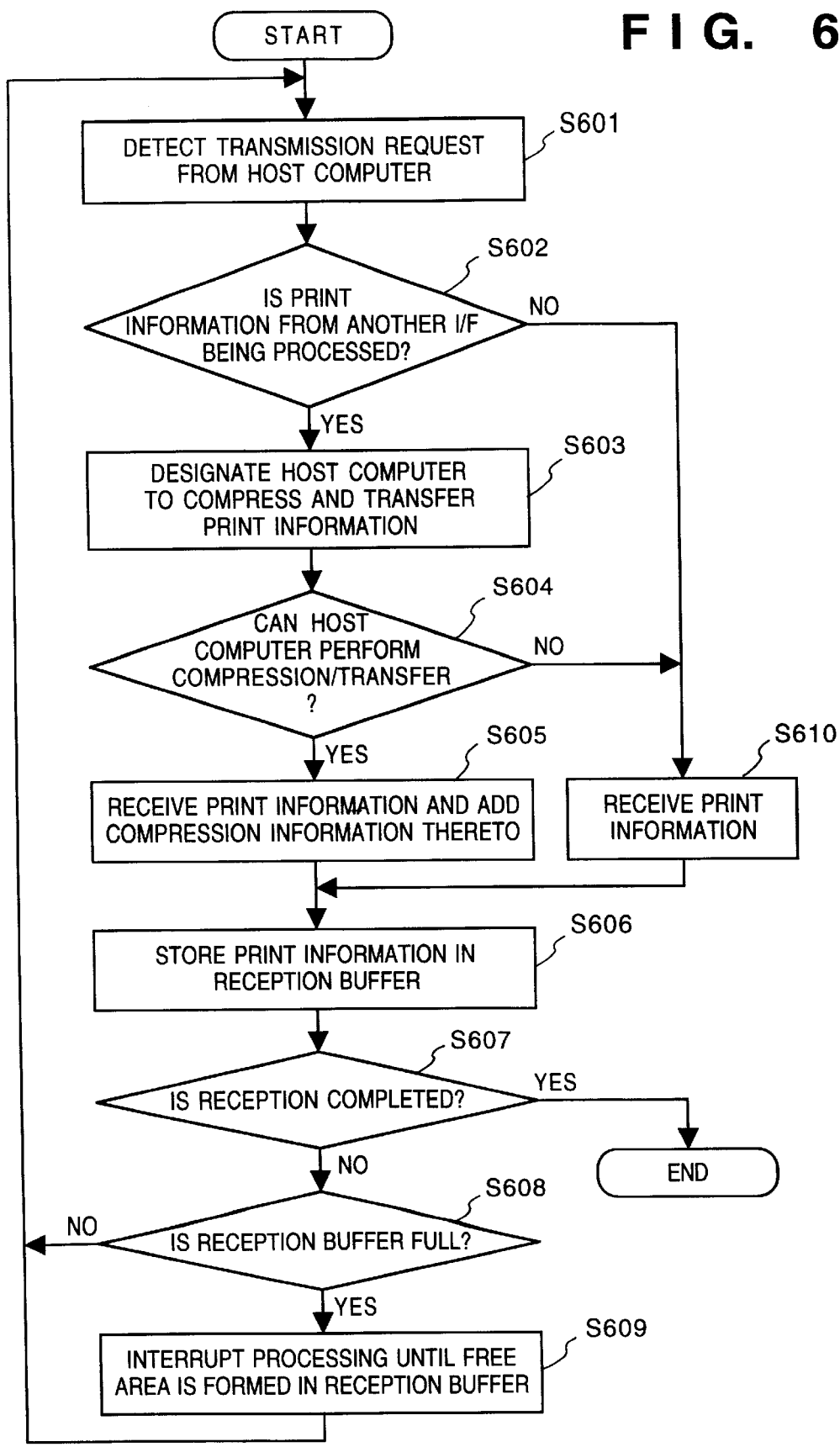
FIG. 6 is a flow chart showing the flow of reception processing for print information.

FIG. 6 is a flow chart showing a case wherein a plurality of host computers 3000 transmit print information to the printer 1500, more specifically the flow of processing to be performed when a host computer in the wait state with respect to transmission of print data is requested to transmit print information to the printer 1500 upon compressing the information.

When a transmission request for print information from the host computer 3000 is detected in step S601, the flow advances to step S602.

In step S602, the processed state of another piece of print information received from another interface (host computer) is checked. If it is determined that output processing is being performed, the flow advances to step S603.

In step S603, an instruction to transmit print information upon compressing it is transmitted to the host computer 3000 associated with the transmission request. The flow then advances to step S604.

In step S604, a response from the host computer 3000 with respect to the instruction is determined. If the host computer 3000 can transmit the print information upon compressing it, the flow advances to step S605.

In step S605, the print information is received, and auxiliary information (compression flag) indicating that the print information is compressed is added to the print information. In step S606, the received print information and the corresponding auxiliary information are stored in a reception buffer 1100.

If it is determined in step S602 that output processing associated with another interface is not being performed, or it is determined in step S604 that the host computer 3000 associated with the transmission request does not perform compression processing of the print information, the flow directly advances to step S610. In this case, the print information having undergone no compression processing is stored in the reception buffer 1100 in step S606.

In step S607, the received state is determined. If it is determined that the reception processing is completed, the series of operations is terminated.

If the reception processing is not completed, the flow advances to step S608. In step S608, a free area in the reception buffer 1100 is checked to determine whether further print information can be stored. If there is a free area in the reception buffer 1100, the flow returns to step S601 to repeat the series of operations. If the reception buffer 1100 is full, the flow advances to step S609.

If a free area appears in the reception buffer 1100 in step S609, the flow returns to step S601 to repeat the series of operations.

Note that output processing associated with the received print information may be performed in accordance with the flow chart shown in FIG. 7 in the first embodiment.

Figure 13:
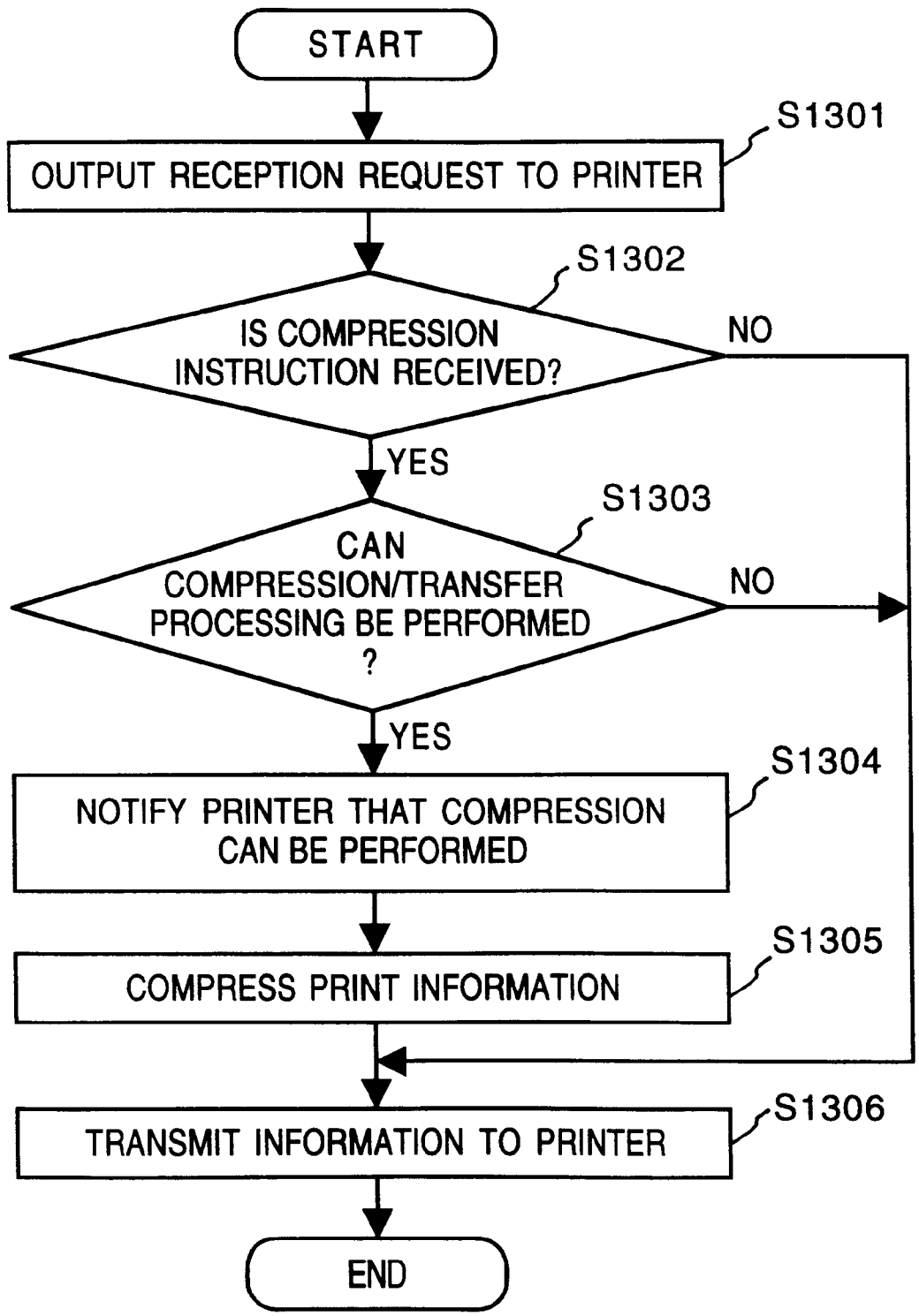
FIG. 13 is a flow chart showing the flow of processing in which a host computer transmits print information.

FIG. 13 is a flow chart showing the flow of transmission processing of print information. Note that the program codes associated with this flow chart are stored in the program ROM 3b or the external memory 11.

In step S1301, a request for reception of print information is output to the printer 1500. The flow then advances to step S1302.

If it is determined in step S1302 that an instruction to compress/transmit print information is received from the printer 1500, the flow advances to step S1303. If such an instruction is not received, the flow directly advances to step S1306 to transmit the print information to the printer 1500.

In step S1303, it is checked whether the host computer 3000 can compress and transmit the print information. If YES in step S1303, the flow advances to step S1304 to notify the printer 1500 of the corresponding information. If NO in step S1303, the flow directly advances to step S1306 to transmit the print information to the printer 1500.

In step S1305, the host computer 3000 compresses the print information. In step S1306, the host computer 3000 transmits the compressed print information.

Note that any data compression method may be used Information about a compression method may be added as the above auxiliary information to print information to properly select one of a plurality of compression methods in accordance with data compression methods which the host computers 3000 can employ.

In addition, compression conditions different from those in this embodiment may be used. For example, conditions for a case wherein print information is not compressed may be added in consideration of a compression efficiency, the transfer rate of an interface, and the processing load on the printer 1500.

As described above, when a transmission request for print information from a host computer is received, the processed state of print information associated with another interface (host computer) is checked. If another piece of print information is being processed, the host computer associated with the transmission request may be caused to compress and transmit the print information, or the print information may be compressed by the printer and stored in the reception buffer, thereby efficiently storing the print information. With this operation, even if the host computer transmits a large amount of print information, transfer processing can be performed without being waited by printing processing associated with another interface. As a result, the time in which a host computer is engaged in printing processing can be shortened.

Third Embodiment

This embodiment exemplifies the structure of another reception buffer in the printer of the above embodiment. This structure will be described below with reference to FIGS. 8 and 12.

Figure 12:
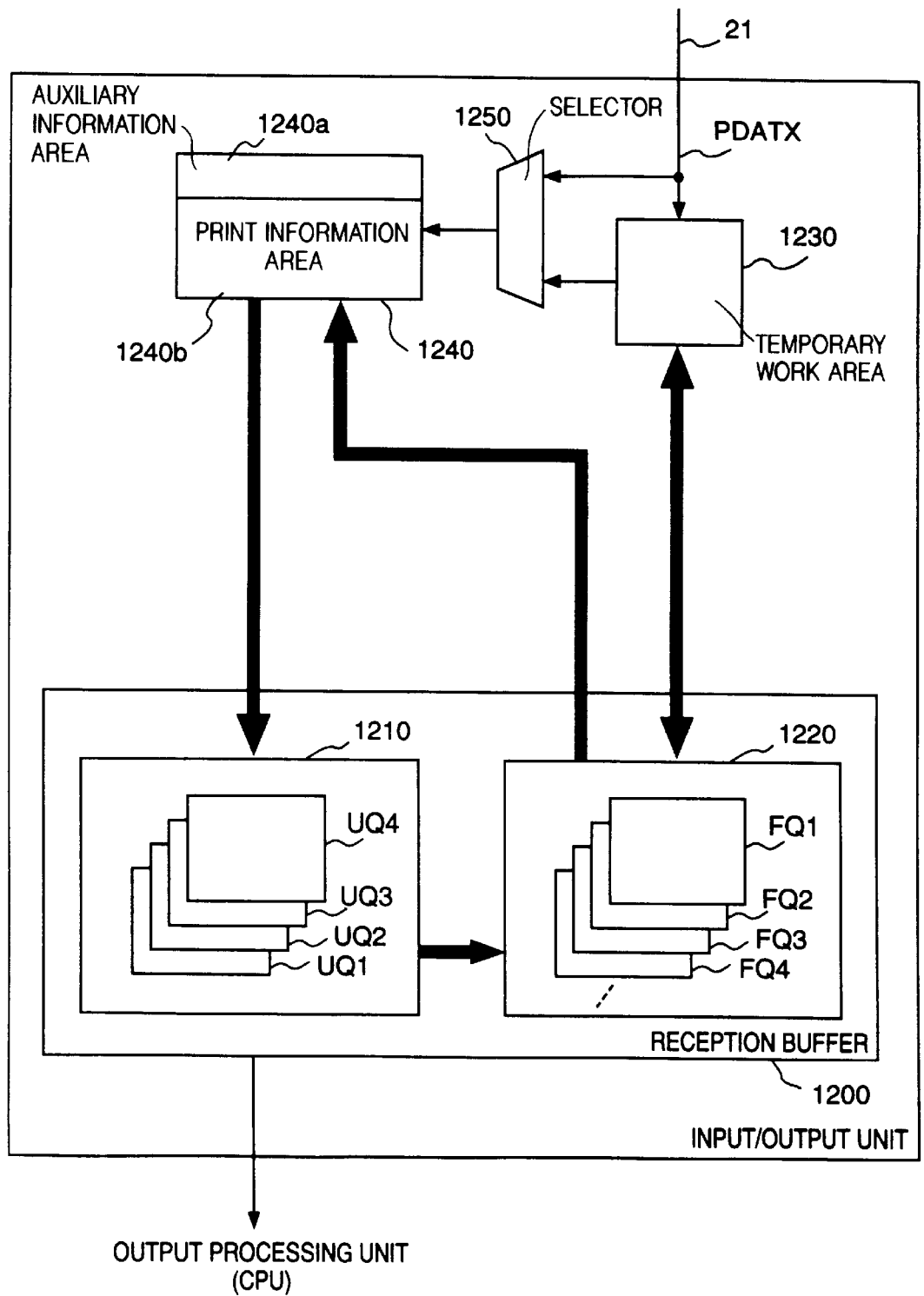
FIG. 12 is a view showing the internal structure of a reception buffer.

FIG. 12 shows the structure of the reception buffer of this embodiment. Referring to FIG. 12, reference numeral 1200 denotes a reception buffer. The reception buffer 1200 is divided in units of predetermined buffer capacities. Each of the divided areas will be referred to as a queue hereinafter. Queues UQ1 to UQ4 in an area 1210 are queues in use, in which pieces of print information are stored. Queues FQ1 to FQ4 in an area 1220 and queues (FQ5...) following them are free queues.

Reference numeral 1230 denotes a temporary work area in which compression processing of received print information is performed. This area is ensured by temporarily lending a free area from the area 1220. After compression processing, this queue is returned to the area 1220.

Reference numeral 1250 denotes a selector to select print information PDAT supplied from one of a plurality of host computers via an interface cable 21 or print information compressed in the compression work area 1230 and store the selected information in an print information area.

Reference numeral 1240 denotes a transfer area having an auxiliary information area 1240a for storing a compression flag indicating whether print information has undergone compression processing, and information indicating the data size of print information, and a print information area 1240b for storing print information transferred via the selector 1250. This area can be obtained by extracting a free queue from the area 1220. When transfer of print information and storage of auxiliary information with respect to the transfer area 1240 are completed, the area 1240 is stored as a queue in use in the area 1210.

The queues storing print information and the like in the area 1210 are sequentially output to an output processing unit (processed by the CPU), and the output queues are returned as unused queues to the area 1220.

Referring to FIG. 12, the thick arrows indicate the conceptual movement of the above queues, and the thin arrows indicate the flow of data.

The flow of processing will be described below with reference to FIG. 8.

Figure 8:
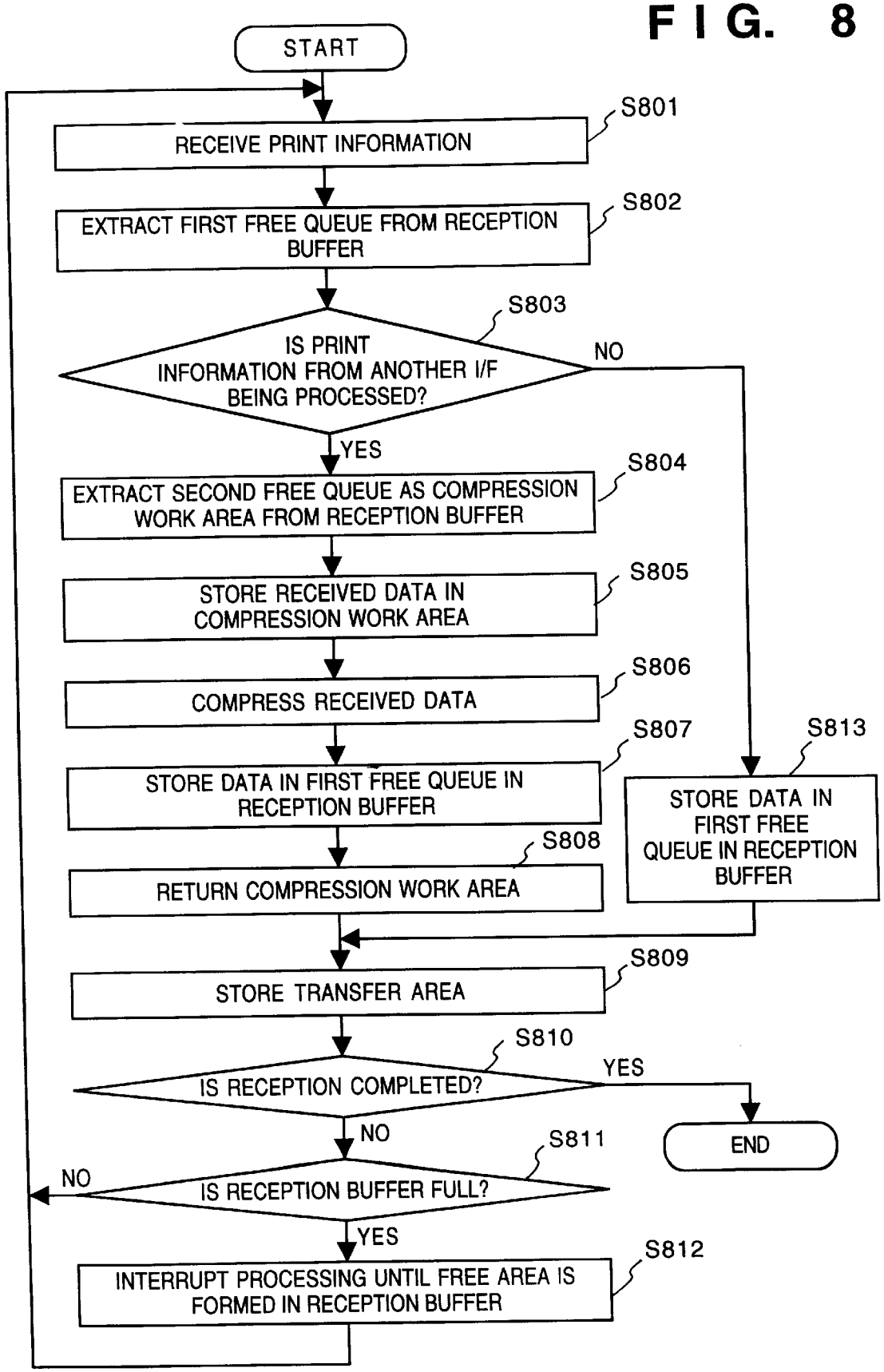
FIG. 8 is a flow chart showing the flow of reception processing for print information.

FIG. 8 is a flow chart showing the flow of reception processing of print information.

Note that the programs associated with this flow chart are stored in the program ROM 13b or the external memory 14.

When print information is received from the host computer 3000 in step S801, a free queue (e.g., FQ1) is extracted, as the transfer area 1240 from the area 1220 of the reception buffer 1200.

In step S803, it is checked whether another piece of print information received from another interface (host computer) is being processed. If YES in step S803, the flow advances to step S804. If NO in step S803, the flow advances to step S813.

In step S804, a free queue (e.g., FQ2) is ensured as the compression work area 1230 from the area 1220 of the reception buffer 1200. The flow then advances to step S805.

In step S805, the print information received from the host computer 3000 is temporarily stored in the compression work area 1230. In step S806, the print information is compressed.

In step S807, the compressed print information is transferred to the transfer area 1240, and auxiliary information such as a compression flag indicating that the information is compressed is stored in the print information area 1240a.

In step S808, the compression work area is returned to the area 1220. If it is determined in step S803 that no other print information is present, the print information is stored in the print information area 1240b, and the auxiliary information is stored in the print information area 1240a in step S813.

In step S809, the transfer area 1240 is stored as a queue in use (e.g., UQ5) in the area 1210.

In step S810, it is checked whether the reception processing is completed. If there is no print information to be received, the series of operations is terminated. If there is print information to be received, the flow advances to step S811 to check the use state of the reception buffer 1200. If there is no free queue in the area 1220 of the reception buffer 1200, the flow advances to step S812. If there is a free queue, the flow returns to step S801 to repeat the series of operations.

In step S812, a queue in use (e.g., UQ1) is supplied to the output processing unit to interrupt the processing until a free queue appears. If a free queue appears, the flow returns to step S801 to repeat the series of operations.

Note that the compression work area is not limited to a free queue in the reception buffer, but may be a RAM space other than the reception buffer, a secondary memory means as a hard disk, or the like.

In addition, as in the second embodiment, print information may be compressed on the host computer side.

As described above, when print information is received from a host computer, the print information is compressed and stored in accordance with a situation to allow efficient use of the reception buffer area. The wait time based on a shortage of a reception buffer area is shortened, and hence the time required for the host computer to perform printing processing can be shortened.

Furthermore, the reception buffer area is divided into a plurality of blocks, and the reception buffer is managed in units of blocks. As a result, the reception buffer can be easily managed.

Fourth Embodiment

In this embodiment, other processing operations of the control unit 1000 of the printer 1500 in the first embodiment will be described. Three different cases of printing processing performed in accordance with a priority order will be described with reference to FIGS. 9, 10, and 14.

Figure 9:
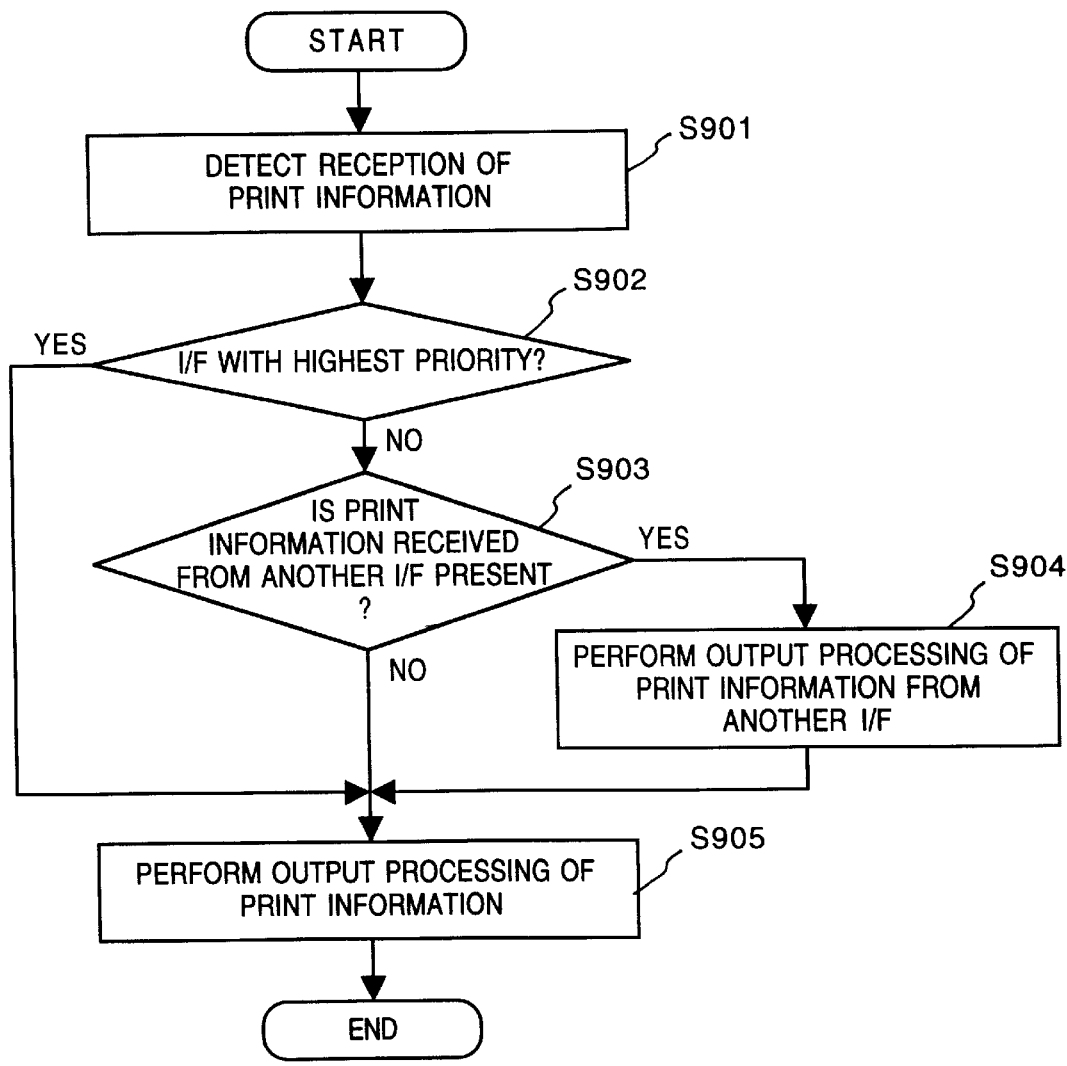
FIG. 9 is a flow chart showing the flow of output processing.

FIG. 9 is a flow chart showing the flow of processing to be performed when output processing is performed in accordance with the priority associated with printing processing which an interface (host computer) has. Note that the program codes associated with this flow chart are stored in the program ROM 13b or the external memory 14.

When reception of print information is detected in step S901, the flow advances to step S902.

In step S902, the priority of the interface (host computer) associated with a transmission request is determined. If it is determined that the interface having undergone reception detection in step S901 has the highest priority associated with printing processing, the flow advances to step S905 to perform output processing of the print information. If it is determined in step S902 that the priority of another interface is higher, the flow advances to step S903.

In step S903, it is checked whether there is unprocessed print information received from another interface. If NO in step S903, the flow advances to step S905 to perform output processing of the print information.

If YES in step S903, the flow advances to step S904 to perform output processing of the unprocessed print information. The flow then advances to step S905.

Note that a priority may be set by a control command through the host computer 3000 or the like or may be set by the user through an operation unit 1501. Alternatively, a priority may be set in accordance with an initialization value stored in a storage medium such as a RAM or ROM. Another method may be used.

Figure 10:
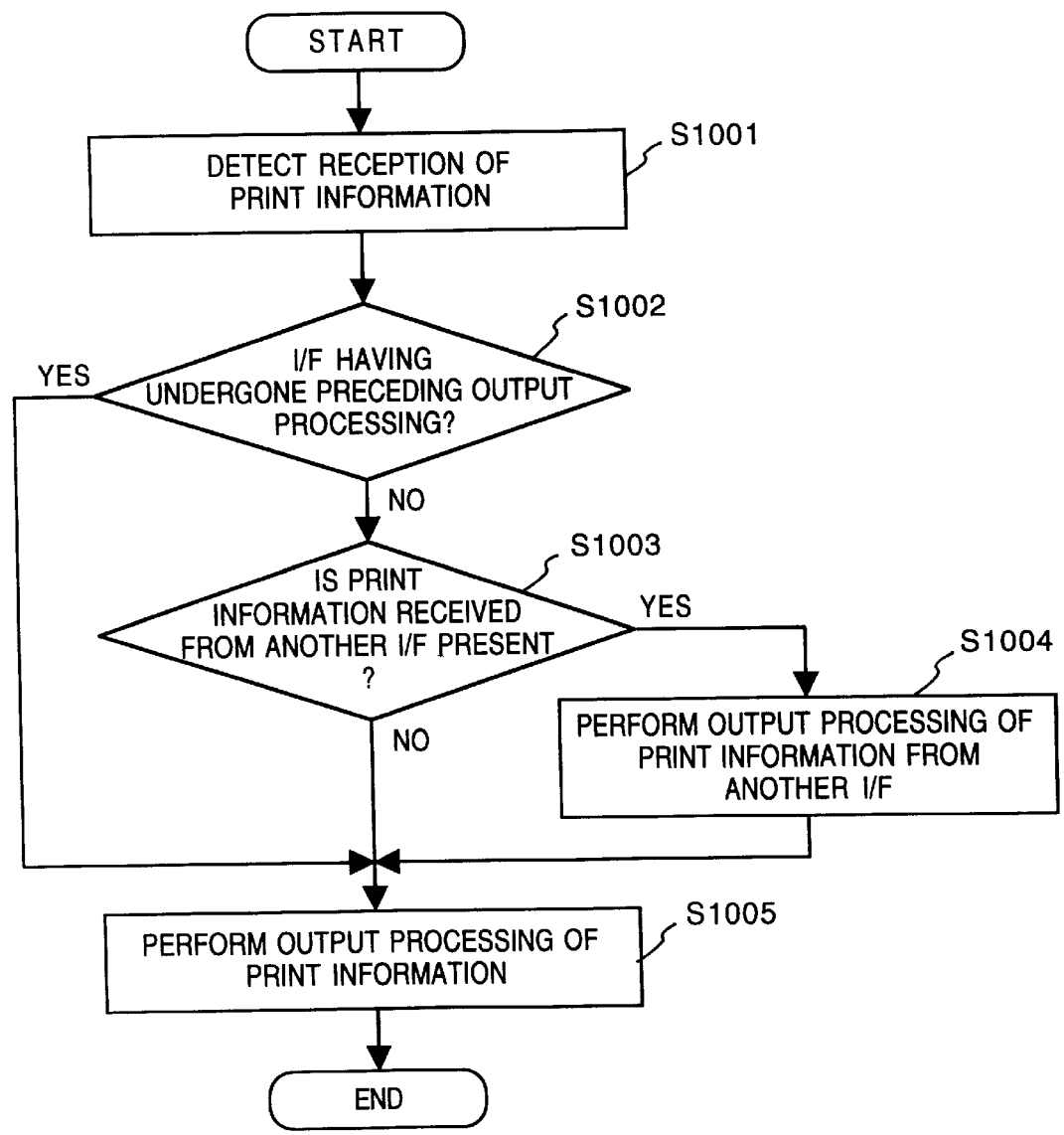
FIG. 10 is a flow chart showing the flow of output processing.

FIG. 10 is a flow chart showing a form of dynamically determining a priority, more specifically the flow of processing to be performed when output processing is performed after the priority of an interface having undergone preceding output processing is decreased. Note that the program codes associated with this flow chart are stored in a program ROM 13b or an external memory 14.

When reception of print information is detected in step S1001, the flow advances to step S1002.

In step S1002, it is checked whether the interface (host computer) having undergone reception detection in step S1001 is the same as the interface which has performed preceding output processing. If YES in step S1002, the flow directly advances to step S1005 to perform output processing of the currently received print information.

If NO in step S1002, the flow advances to step S1003.

In step S1003, it is checked whether there is unprocessed print information received from another interface. If NO in step S1003, the flow advances to step S1005 to perform output processing of the currently received print information.

If YES in step S1003, the flow advances to step S1004 to complete output processing of the unprocessed print information. The flow then advances to step S1005.

As described above, according to the flow chart in FIG. 10, output processing is performed after the priority of an interface which has performed preceding output processing is decreased. However, in contrast to this, output processing may be performed after the priority of an interface which has performed preceding output processing is increased. In this case, if it is determined in step S1002 that the interface having undergone reception detection is the same as the interface which has performed preceding output processing, the flow may advance to step S1005. Otherwise, the flow may advance to step S1003.

Figure 14:
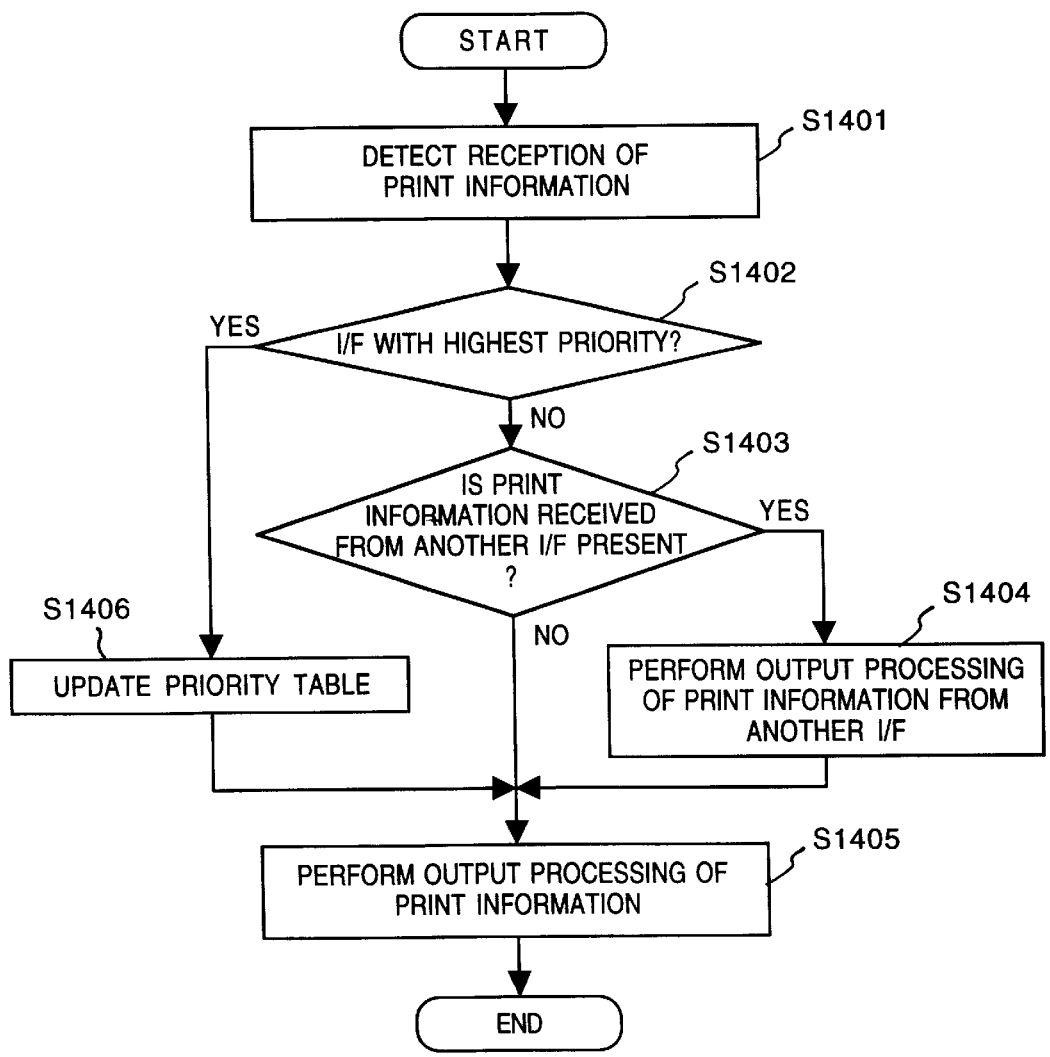
FIG. 14 is a flow chart showing the flow of processing in which the priority of printing processing is updated in accordance with the frequency of output processing.

FIG. 14 is a flow chart showing the flow of processing to be performed when output processing is performed in accordance with the frequency of printing processing of an interface or the like from which information is received. Note that the program codes associated with this flow chart are stored in the program ROM 13b or the external memory 14.

When reception of print information is detected in step S1401, the flow advances to step S1402.

In step S1402, the priority of the interface (host computer) associated with reception detection is determined in accordance with a priority table 1700 (to be described later). If it is determined that the interface having undergone reception detection in step S1401 has the highest priority associated with printing processing, the flow advances to step S1406. If it is determined in step S1402 that the priority of another interface is higher, the flow advances to step S1403.

In step S1403, it is checked whether there is unprocessed print information received from another interface. If NO in step S1403, the flow advances to step S1405 to perform output processing of the print information.

If YES in step S1403, the flow advances to step S1404 to perform output processing of the unprocessed print information. The flow then advances to step S1405.

In step S1406, the priority table 1700, on which the frequency of output processing within a predetermined period of time is recorded, is updated. The flow advances to step S1405. To update the priority table 1700 is to rewrite the information associated with the frequency of output processing and change the priority order. The predetermined period of time, update conditions for the priority table 1700, and the like may be set in accordance with set values from, e.g., a host computer, values set by the users, initialization values stored in a storage medium such as a RAM or ROM. However, other methods may be used.

FIGS. 17A and 17B show priority tables. In the priority table in FIG. 17A, the priority of an interface (host computer) increases as the frequency of use increases. In the priority table 1700 in FIG. 17B, the priority of an interface (host computer) increases as the frequency of use decreases. Note that this priority table may be held in a RAM 19 or the like.

As described above, the priority order of interfaces which request output processing is set and controlled to prevent, for example, a host computer having an interface with a high transfer rate from being waited by a specific interface with a low transfer rate, thereby allowing efficient use of resources.

As is apparent, as long as the function of the present invention is executed, the present invention can be applied to a single device, a system constituted by a plurality of devices, or a system which performs processing via a network such as a LAN.

According to the output apparatus of the present invention, print information can be efficiently stored. More specifically, even if an information processing apparatus transmits a large amount of print information, transfer processing can be performed without being waited by printing processing performed by another information processing apparatus. As a result, the time in which the information processing apparatus is engaged with printing processing can be shortened. In addition, the wait time based on a shortage of a reception buffer area is shortened, and hence the time required for the host computer to perform printing processing can be shortened.

In addition, the priority order of interfaces which request output processing is set and controlled to prevent, for example, a host computer having an interface with a high transfer rate from being waited by specific interface with a low transfer rate, thereby allowing efficient use of resources.

According to the information processing apparatus of the present invention, print information can be efficiently stored. More specifically, even if an information processing apparatus transmits a large amount of print information, transfer processing can be performed without being waited by printing processing performed by another information processing apparatus. As a result, the time in which the information processing apparatus is engaged with printing processing can be shortened. In addition, the wait time based on a shortage of a reception buffer area is shortened, and hence the time required for the host computer to perform printing processing can be shortened.

According to the output system of the present invention, print information can be efficiently stored. More specifically, even if an information processing apparatus transmits a large amount of print information, transfer processing can be performed without being waited by printing processing performed by another information processing apparatus. As a result, the time in which the information processing apparatus is engaged with printing processing can be shortened. In addition, the wait time based on a shortage of a reception buffer area is shortened, and hence the time required for the host computer to perform printing processing can be shortened.

Fifth Embodiment

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

The present invention is not limited to the above embodiments and various changes and modifications can be made within the spirit and scope of the present invention. therefore, to apprise the public of the scope of the present invention the following claims are made.

What is claimed is:

1. A printing apparatus for outputting images based on print information received from a plurality of information processing apparatuses by a respective plurality of reception means, comprising:

compression means for compressing the print information;

storage means for storing the print information in a memory medium;

image output means for outputting an image based on the print information; and control means for controlling said compression means and said storage means so as to compress first print information received by a first one of the plurality of reception means and to store the compressed first print information in the memory medium when second print information received by a second one of the plurality of reception means is being processed, and to store the first print information in the memory medium without compressing the first print information when the second print information is not being processed.

2. The apparatus according to claim 1, further comprising management means for managing the memory medium, said management means controlling the plurality of reception means to interrupt reception of succeeding print information when a free-area shortage occurs in the memory medium.

3. The apparatus according to claim 2, wherein said management means divides an area of the memory medium into a plurality of blocks, and manages the memory medium in units of divided blocks.

4. A control method for a printing apparatus for outputting images based on print information received from a plurality of information processing apparatuses by a respective plurality of reception means, said method comprising:

a compression step of compressing the print information;

a storage step of storing the print information in a memory medium;

an image output step of outputting an image based on the print information; and a control step of controlling said compression step and said storage step so as to compress first print information received by a first one of the plurality of reception means and to store the compressed first print information in the memory medium when second print information received by a second one of the plurality of reception means is being processed, and to store the first print information in the memory medium without compressing the first print information when the second print information is not being processed.

5. The method according to claim 4, further comprising a management step of managing the memory medium, said management step including a step of controlling the plurality of reception means to interrupt reception of succeeding print information when a free-area shortage occurs in the memory medium.

6. The method according to claim 5, wherein said management step divides an area of the memory medium into a plurality of blocks, and manages the memory medium in units of divided blocks.

7. A computer readable memory storing a control program for executing a method in a printing apparatus for outputting images based on print information received from a plurality of information processing apparatuses by a respective plurality of reception means, the method comprising:

a compression step of compressing the print information;

a storage step of storing the print information in a memory medium;

an image output step of outputting an image based on the print information; and a control step of controlling said compression step and said storage step so as to compress first print information received by a first one of the plurality of reception means and to store the compressed first print information in the memory medium when second print information received by a second one of the plurality of reception means is being processed, and to store the first print information in the memory medium without compressing the first print information when the second print information is not being processed.

8. A printing apparatus for outputting an image based on print information sent from an information processing apparatus, comprising:

detection means for detecting a transmission request for the print information from the information processing apparatus;

request means for requesting the information processing apparatus as a transmission request source to transmit the print information;

reception means for receiving the print information from the information processing apparatus as the transmission request source;

storage means for storing the received print information in a memory medium;

image output means for outputting an image based on the print information; and control means for controlling said request means to request the information processing apparatus as the transmission request source to compress and transmit first print information in a case where second print information is being processed when a transmission request for the first print information is detected by said detection means.

9. The apparatus according to claim 8, wherein said reception means includes a plurality of interface means corresponding to a plurality of information processing apparatuses, said detection means detecting a transmission request with respect to each of the plurality of interface means.

10. The apparatus according to claim 8, further comprising management means for managing the memory medium, said management means controlling said reception means to interrupt reception of succeeding print information when a free-area shortage occurs in the memory medium.

11. A control method for a printing apparatus for outputting an image based on print information sent from an information processing apparatus, comprising:

a detection step of detecting a transmission request for the print information from the information processing apparatus;

a request step of requesting the information processing apparatus as a transmission request source to transmit the print information;

a reception step of receiving the print information from the information processing apparatus as the transmission request source;

a storage step of storing the received print information in a memory medium;

an image output step of outputting an image based on the print information; and a control step of controlling said request step to request the information processing apparatus as the transmission request source to compress and transmit first print information in a case where second print information is being processed when a transmission request for the first print information is detected by said detection step.

12. The method according to claim 11, wherein the reception step includes a plurality of interface control steps corresponding to a plurality of information processing apparatuses, and the detection step includes the step of detecting a transmission request corresponding to each of the plurality of interface control steps.

13. The method according to claim 11, further comprising a management step of managing the memory medium, said management step including controlling said reception step to interrupt reception of succeeding print information when a free-area shortage occurs in the memory medium.

14. A computer readable memory storing a control program for executing a method for a printing apparatus for outputting an image based on print information sent from an information processing apparatus, the method comprising:

a detection step of detecting a transmission request for the print information from the information processing apparatus;

a request step of requesting the information processing apparatus as a transmission request source to transmit the print information;

a reception step of receiving the print information from the information processing apparatus as the transmission request source;

a storage step of storing the received print information in a memory medium;

an image output step of outputting an image based on the print information; and a control step of controlling said request step to request the information processing apparatus as the transmission request source to compress and transmit first print information in a case where second print information is being processed when a transmission request for the first print information is detected in said detection step.

15. An information processing apparatus for supplying print information to an output apparatus to output an image, comprising:

transmission request means for notifying the output apparatus of a transmission request for print information;

reception means for receiving a compression request from the output apparatus, the compression request requesting to compress and transmit print information;

compression means for compressing the print information in accordance with the received compression request to provide compressed print information; and transmission means for transmitting the compressed print information to the output apparatus.

16. A control method for an information processing apparatus for supplying print information to an output apparatus to output an image, comprising:

a transmission request step of notifying the output apparatus of a transmission request for print information;

a reception step of receiving a compression request from the output apparatus, the compression request requesting to compress and transmit print information;

a compression step of compressing the print information in accordance with the received compression request to provide compressed print information; and a transmission step of transmitting the compressed print information to the output apparatus.

17. A computer readable memory storing a control program for executing a method for an information processing apparatus for supplying print information to an output apparatus to output an image, comprising:

a transmission request step of notifying the output apparatus of a transmission request for print information;

a reception step of rceiving a compression request from the output apparatus, the compression request requesting to compress and transmit print information;

a compression step of compressing the print information in accordance with the received compression request to provide compressed print information; and a transmission step of transmitting the compressed print information to the output apparatus.

18. A printing system for supplying print information from an information processing apparatus to a printing apparatus and causing the printing apparatus to output an image, the information processing apparatus comprising:
transmission request means for notifying the printing apparatus of a transmission request for print information;
reception means for receiving a compression request from the printing apparatus, the compression request requesting to transmit print information;
compression means for compressing the print information in accordance with the received compression request to provide compressed print information; and
transmission means for transmitting the compressed print information to the printing apparatus, and the printing apparatus comprising:
detection means for detecting the transmission request from the information processing apparatus;
request means for requesting the information processing apparatus as a transmission request source to transmit the print information;
reception means for receiving the print information from the information processing apparatus as the transmission request source;
storage means for storing the received print information in a memory medium;
image output means for outputting an image based on the print information; and
control means for controlling said request means to request the information processing apparatus as the transmission request source to compress and transmit first print information in a case where second print information is being processed when a transmission request for the first print information is detected by said detection means.

19. A control method for a printing system for supplying print information from an information processing apparatus to a printing apparatus and causing the printing apparatus to output an image, said method comprising, in the information processing apparatus:
a transmission request step of notifying the printing apparatus of a transmission request for print information;
a reception step of receiving a compression request from the printing apparatus, the compression request requesting to compress and transmit print information;
a compression step of compressing the print information in accordance with the received compression request to provide compressed print information; and
a transmission step of transmitting the compressed print information to the printing apparatus, and said method further comprising, in the printing apparatus:
a detection step of detecting a transmission request for the print information from the information processing apparatus;
a request step of requesting the information processing apparatus as a transmission request source to transmit the print information;
a reception step of receiving the print information from the information processing apparatus as the transmission request source;
a storage step of storing the received print information in a memory medium;
an image output step of outputting an image based on the print information; and
a control step of controlling said request step to request the information processing apparatus as the transmission request source to compress and transmit first print information in a case where second print information is being processed when a transmission request for the first print information is detected in said detection step.

* * * * *

UNITED STATES PATENT AND TRADEMARK OFFICE
CERTIFICATE OF CORRECTION

PATENT NO.   : 6,137,587
DATED        : October 24, 2000
INVENTOR(S)  : Shin Muto et al.

It is certified that error appears in the above-identified patent and that said Letters Patent is hereby corrected as shown below:

Title page,
Item [56] REFERENCES CITED, ATTORNEY, AGENT OR FIRM

Fitzpatrick Cella Harper & Scinto should read -- Fitzpatrick, Cella, Harper & Scinto --.

Column 2,
Line 23, "another" should read -- other --.

Column 3,
Line 4, "another" should read -- other --.

Column 6,
Line 4, "programs" should read -- program --.

Column 7,
Line 18, "us" should read -- bus --.

Column 10,
Line 51, "used" should read -- used. --.

Column 11,
Line 36, "an" should read -- a --.

Column 15,
Line 43, "processes" should read -- process --.

UNITED STATES PATENT AND TRADEMARK OFFICE
CERTIFICATE OF CORRECTION

PATENT NO. : 6,137,587
DATED : October 24, 2000
INVENTOR(S) : Shin Muto et al.

It is certified that error appears in the above-identified patent and that said Letters Patent is hereby corrected as shown below:

Column 19,
Line 1, "rceiving" should read -- receiving --.

Signed and Sealed this

Thirteenth Day of November, 2001

Attest:

*Nicholas P. Godici*

NICHOLAS P. GODICI
*Attesting Officer*　　*Acting Director of the United States Patent and Trademark Office*